US007886965B2

(12) United States Patent  
Kallin et al.

(10) Patent No.: US 7,886,965 B2
(45) Date of Patent: Feb. 15, 2011

(54) SCALEABLE CHECK PROCESSING MODULE FOR A SELF-SERVICE CHECK DEPOSITING TERMINAL

(75) Inventors: Fredrik L. N. Kallin, Waterloo (CA); David W. Norris, Cambridge (CA); Frank B. Dunn, Waterloo (CA)

(73) Assignee: NCR Corporation, Duluth, GA (US)

( * ) Notice: Subject to any disclaimer, the term of this patent is extended or adjusted under 35 U.S.C. 154(b) by 404 days.

(21) Appl. No.: 12/152,777

(22) Filed: May 16, 2008

(65) Prior Publication Data

US 2009/0283584 A1    Nov. 19, 2009

(51) Int. Cl.
*G06Q 40/00* (2006.01)
*G07D 11/00* (2006.01)
*G07F 19/00* (2006.01)

(52) U.S. Cl. .......................... 235/379; 235/375; 705/45
(58) Field of Classification Search ................ 235/379, 235/381, 375; 705/43–45
See application file for complete search history.

(56) References Cited

U.S. PATENT DOCUMENTS 6,273,413 B1 * 8/2001 Graef ........................ 271/3.14

| 2003/0116622 | A1* | 6/2003 | Suttie et al. | 235/379 |
| 2005/0006458 | A1* | 1/2005 | Wanibe et al. | 235/379 |
| 2008/0061127 | A1* | 3/2008 | Brexel | 235/379 |
| 2009/0063355 | A1* | 3/2009 | Antoo et al. | 705/78 |

* cited by examiner

*Primary Examiner*—Edwyn Labaze
(74) *Attorney, Agent, or Firm*—Paul W. Martin

(57) ABSTRACT

A scaleable check processing module (SCPM) is provided for a self-service check depositing terminal. The SCPM comprises a supporting structure. The SCPM further comprises a first configurable mechanism located in the supporting structure and for (i) enabling a pocket module to be disposed at a first location of the supporting structure when the SCPM is to be installed into a first type of self-service check depositing terminal, (ii) enabling a pocket module to be disposed at a second location which is different from the first location of the supporting structure when the SCPM is to be installed into a second type of self-service check depositing terminal which is different from the first type of self-service depositing terminal, and (iii) enabling a pocket module to be disposed at a third location which is different from the first and second locations of the supporting structure when the SCPM is to be installed into a third type of self-service check depositing terminal which is different from the first and second types of self-service depositing terminals.

10 Claims, 18 Drawing Sheets

SCALEABLE CHECK PROCESSING MODULE FOR A SELF-SERVICE CHECK DEPOSITING TERMINAL

BACKGROUND

The present invention relates to self-service check depositing terminals, and is particularly directed to a scaleable check processing module for a self-service check depositing terminal, such as a check depositing automated teller machine (ATM).

In a typical known check depositing ATM, an ATM customer is allowed to deposit a check (without having to place the check in any deposit envelope) in a publicly accessible, unattended environment. To deposit a check, the ATM customer inserts a user identification card through a user card slot at the ATM, enters the amount of the check being deposited, and inserts the check to be deposited through a check slot of a check acceptor. A check transport mechanism receives the inserted check and transports the check in a forward direction along a check transport path to a number of locations within the ATM to process the check.

If the check is not accepted for deposit, the check transport mechanism transports the check in a reverse direction along the check transport path to return the check to the ATM customer via the check slot. If the check is accepted for deposit, the amount of the check is deposited into the ATM customer's account and the check is transported to a storage bin within the ATM. An endorser printer prints an endorsement onto the check as the check is being transported to and stored in the storage bin. Checks in the storage bin within the ATM are periodically picked up and physically transported via courier to a back office facility of a financial institution for further processing.

The check acceptor is of the type which accepts only one check for each check depositing transaction. This type of check acceptor is sometimes referred to as a "single-check acceptor". Recently, in some known check depositing ATMs, the check acceptor is of the type which can accept a plurality of checks for each check depositing transaction. This type of check acceptor is sometimes referred to as a "bunch-check acceptor".

Also, in some known check depositing ATMs, certain components are housed in modular units which, in turn, are housed in a larger module. The larger module is sometimes referred to as a "check processing module" (CPM). Such modules are included in ATMs provided by NCR Corporation, located in Dayton, Ohio. One example is Model No. CPM4 in which a modular unit called a "pocket module" is located in approximately the top portion of the CPM. The CPM4 is installable on a first type of check depositing ATM. Another example is Model No. CPM2 in which the pocket module is located in approximately the rear central portion of the CPM. The CPM2 is installable on a second type of check depositing ATM which is different from the first type of check depositing ATM. Still another example is Model No. CPM3 in which the pocket module is located in approximately the lower bottom portion of the CPM. The CPM3 is installable on a third type of check depositing ATM which is different from the first and second types of check depositing ATMs. It would be desirable to provide a single CPM which contains components which can be configured to accommodate either a single-check acceptor or a bunch-check acceptor and to provide functionality of the CPM2, the CPM3, or the CPM4.

SUMMARY

In accordance with an embodiment of the present invention, a scaleable check processing module (SCPM) is provided for a self-service check depositing terminal. The SCPM comprises a supporting structure. The SCPM further comprises a first configurable mechanism located in the supporting structure and for (i) enabling a pocket module to be disposed at a first location of the supporting structure when the SCPM is to be installed into a first type of self-service check depositing terminal, (ii) enabling a pocket module to be disposed at a second location which is different from the first location of the supporting structure when the SCPM is to be installed into a second type of self-service check depositing terminal which is different from the first type of self-service depositing terminal, and (iii) enabling a pocket module to be disposed at a third location which is different from the first and second locations of the supporting structure when the SCPM is to be installed into a third type of self-service check depositing terminal which is different from the first and second types of self-service depositing terminals.

DETAILED DESCRIPTION

The present invention is directed to a scaleable check processing module for a self-service check depositing terminal, such as a check depositing automated teller machine (ATM).

Figure 1:
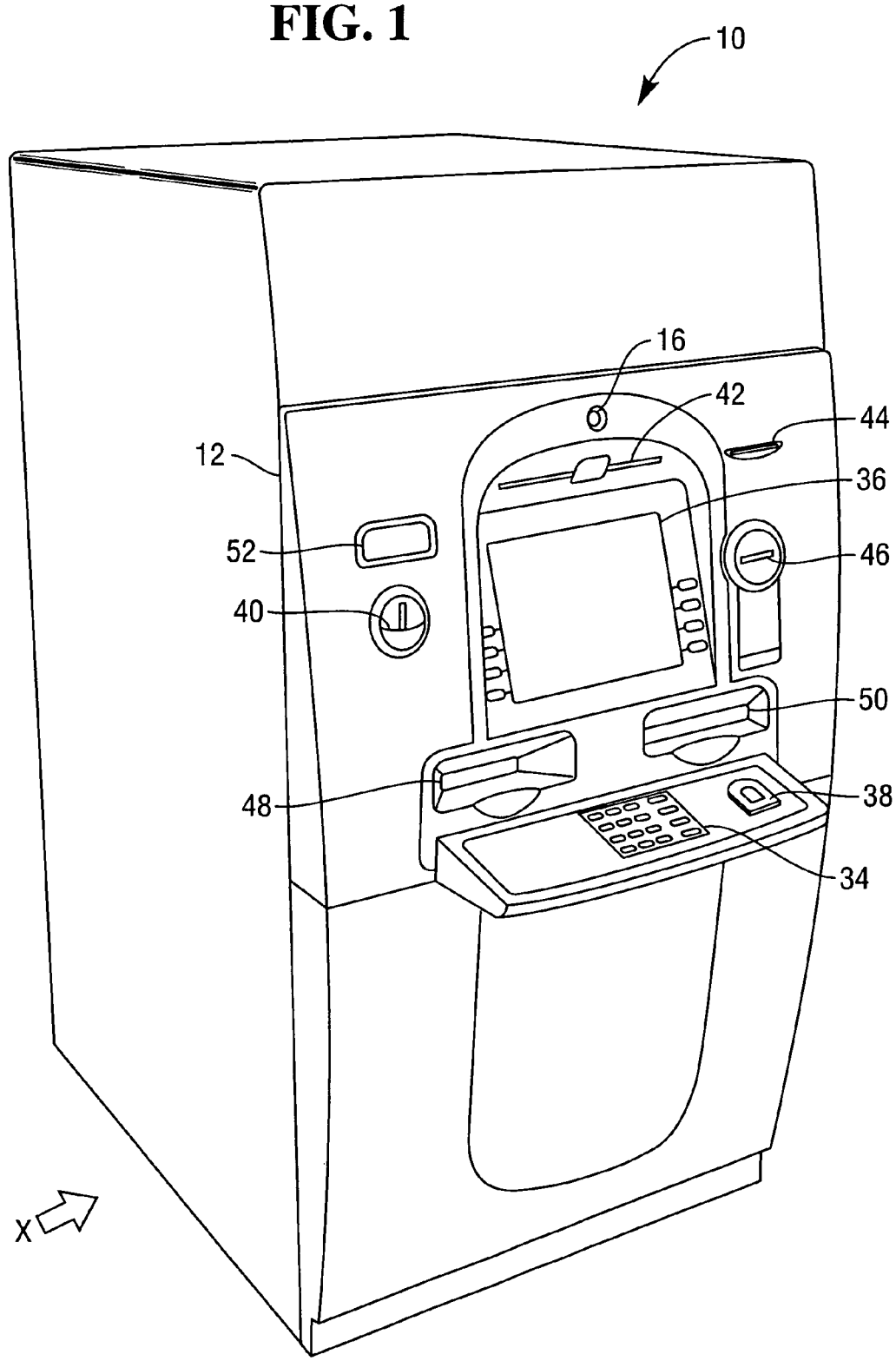
FIG. 1 is a left-front perspective view of a first type of check depositing automated teller machine (ATM) embodying the present invention.

Referring to FIG. 1, a self-service check depositing terminal in the form of an image-based check depositing automated teller machine (ATM) 10 is illustrated. The check depositing ATM 10 comprises a fascia 12 coupled to a chassis (not shown). The fascia 12 defines an aperture 16 through which a camera (not shown) images a customer of the ATM 10. The fascia 12 also defines a number of slots for receiving and dispensing media items, and a tray 40 into which coins can be dispensed. The slots include a statement output slot 42, a receipt slot 44, a card reader slot 46, a cash slot 48, another cash slot 50, and a check input/output slot 52. The slots 42 to 52 and tray 40 are arranged such that the slots and tray align with corresponding ATM modules mounted within the chassis of the ATM 10.

The fascia 12 provides a user interface for allowing an ATM customer to execute a transaction. The fascia 12 includes an encrypting keyboard 34 for allowing an ATM customer to enter transaction details. A display 36 is provided for presenting screens to an ATM customer. A fingerprint reader 38 is provided for reading a fingerprint of an ATM customer to identify the ATM customer. The user interface features described above are all provided on an NCR PERSONAS (trademark) 6676 ATM, available from NCR Financial Solutions Group Limited, Discovery Centre, 3 Fulton Road, Dundee, DD2 4SW, Scotland.

Figure 2:
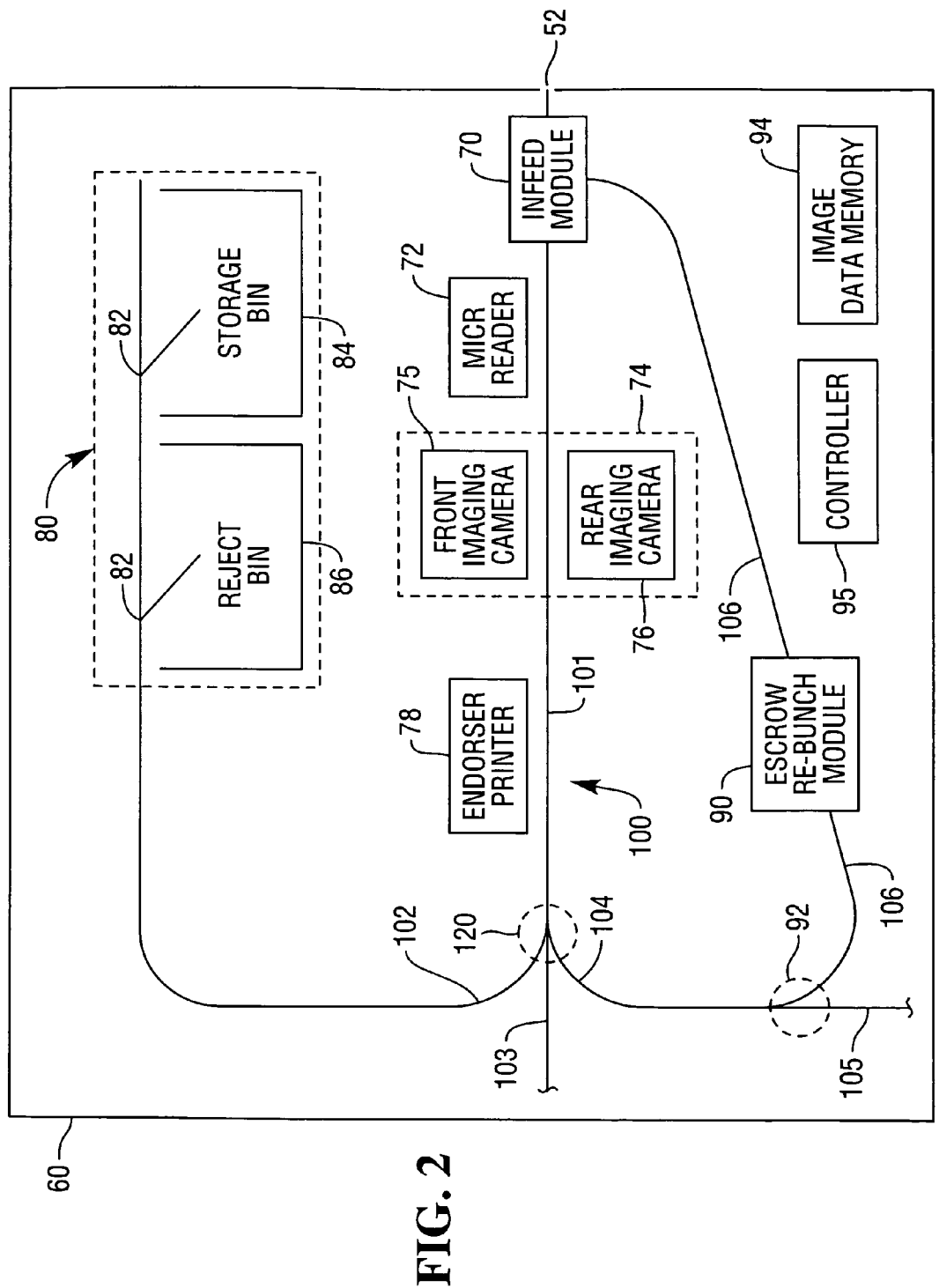
FIG. 2 is a simplified schematic diagram, looking approximately in the direction of arrow X in FIG. 1, and illustrating a scaleable check processing module (SCPM) having a bunch-check acceptor and configured in a first configuration for operation in the first type of check depositing ATM of FIG. 1.
Figure 8:
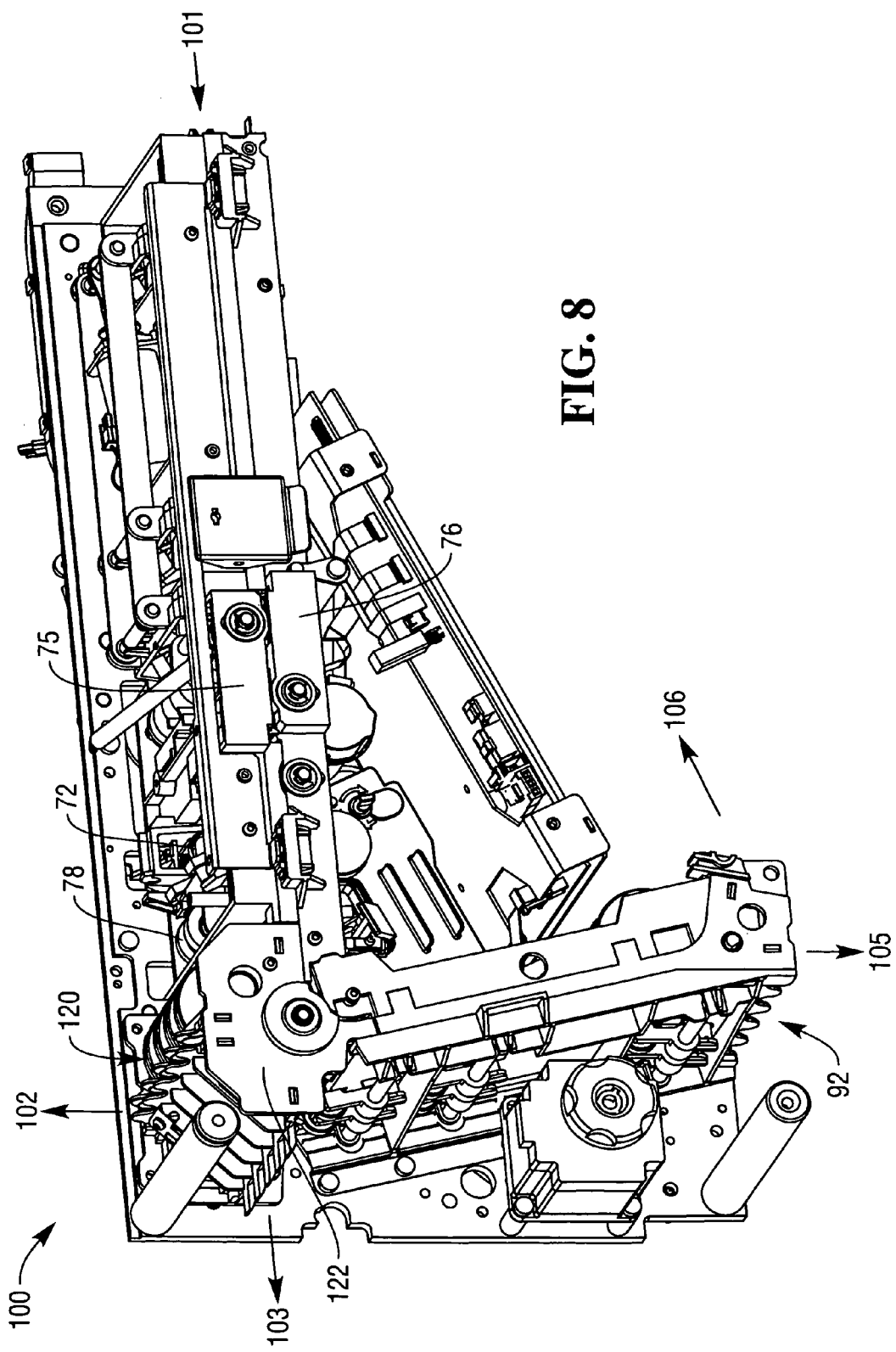
FIG. 8 is a pictorial view of a transport module of the SCPM in the first configuration of FIG. 2.

Referring to FIG. 2, a first configuration of a scaleable check processing module (SCPM) 60 is illustrated. The SCPM 60 in the first configuration will now be described with reference to FIGS. 2 and 8. FIG. 2 is a simplified schematic diagram (looking approximately in the direction of arrow X in FIG. 1) of part of the fascia 12 and main parts of the SCPM 60. FIG. 8 is a pictorial view of a part (to be described later) used in the SCPM 60 in the first configuration of FIG. 2.

The SCPM 60 in the first configuration of FIG. 2 comprises four main units which include an infeed module 70, a pocket module 80, an escrow re-bunch module (ERBM) 90, and a transport module 100 (FIG. 8). The infeed module 70 receives a check which has been deposited into the check input/output slot 52 (see also FIG. 1), and transports the check to an inlet of the transport module 100. The dimensions of the infeed module 70, such as its run length, may vary depending upon the particular model ATM the SCPM 60 is installed. The structure and operation of the infeed module 70 are conventional and well known and, therefore, will not be described.

The transport module 100 includes a check input/output transport mechanism which receives a check from the inlet adjacent to the infeed module 70, and transports the check along a first document track portion 101 which is the main track portion. The transport module 100 includes a first document diverter 120 which is operable to divert a check along a second document track portion 102 to the pocket module 80, a third document track portion 103 (not used in the first configuration shown in FIG. 2), or a fourth document track portion 104 which leads to the ERBM 90.

A second document diverter 92 is operable to divert a check along a fifth document track portion 105 (not used in the first configuration shown in FIG. 2), or a sixth document track portion 106 which leads to the ERBM 90 and then back to the infeed module 70. More specifically, the sixth document track 106 interconnecting the ERBM 90 and the infeed module 70 allows a bunch of checks which has accumulated in the ERBM to be transported back to the infeed module 70. The structure and operation of the second diverter 92 are conventional and well known and, therefore, will not be described.

The transport module 100 further includes a magnetic ink character recognition (MICR) head 72 for reading magnetic details on a code line of a check. The transport module 100 also includes an imager 74 including a front imaging camera 75 and a rear imaging camera 76 for capturing an image of each side of a check (front and rear). An endorser printer 78 is provided for printing endorsements onto checks. An image data memory 94 is provided for storing images of checks. A controller 95 is provided for controlling the operation of the elements within the SCPM 60.

The pocket module 80 includes a main storage bin 84 for storing processed checks. The pocket module 80 further includes a reject bin 86 for storing rejected checks. A divert gate 82 is provided for diverting checks to the reject bin 86. If the checks are not diverted to the reject bin 86, they will continue on to the main storage bin 84. The structure and operation of the pocket module 80 are conventional and well known and, therefore, will not be described.

It should be apparent from the first configuration of the SCPM 60 shown in FIG. 2 that a pocket module (designated with reference numeral "80" in FIG. 2) is located in a top portion of the SCPM. It should also be apparent that the SCPM 60 in the first configuration of FIG. 2 processes a bunch of checks. Each check of the bunch is separated at the infeed module 70 before it is individually processed. Each processed check is then re-assembled at the ERBM 90 to bunch the checks back together. This type of processing is sometimes referred to as "multiple-check processing". Since a bunch of checks are being processed, an escrow module (such as the ERBM 90 shown in FIG. 2) is needed. The ERBM 90 is manufactured and available from Glory Products, located in Himeji, Japan.

The ERBM 90 allows a bunch of checks (i.e., more than one check) to be processed in a single transaction. If a bunch of checks has accumulated in the ERBM 90 and is unable to be processed further within the SCPM 60, then the bunch of checks is transported via the sixth document track portion 106 back to the infeed module 70 to return the bunch of checks to the ATM customer. Accordingly, components of the SCPM 60 in the first configuration of FIG. 2 are configured in a first mode of operation to provide functionality of the Model CPM4 check processing module (which includes a bunch-check acceptor) sold by NCR Corporation.

Figure 3:
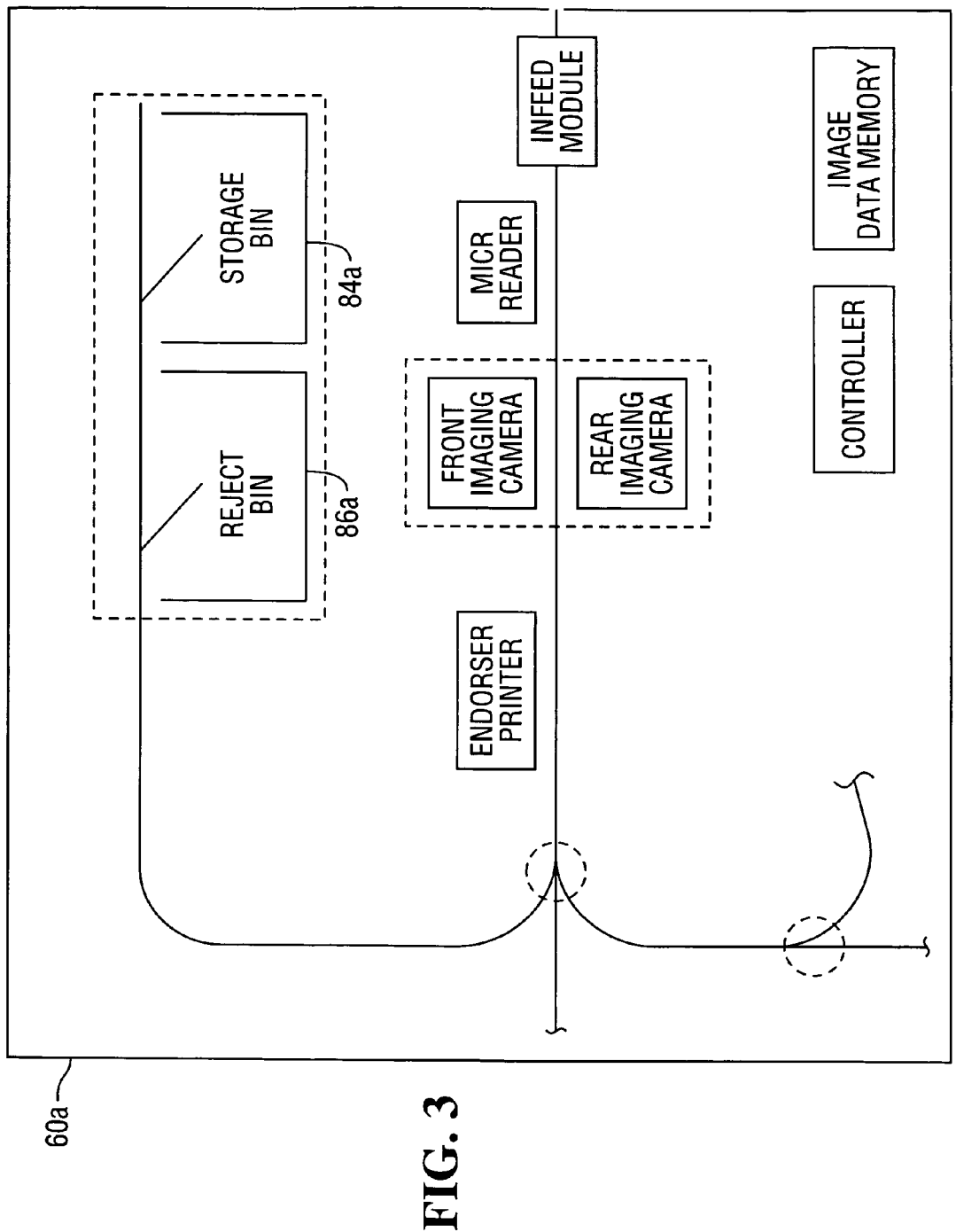
FIG. 3 is diagram similar to the diagram of FIG. 2, and illustrating a SCPM having a single-check acceptor and configured in a second configuration for operation in the first type of check depositing ATM of FIG. 1.

Referring to FIG. 3, a second configuration of the SCPM is illustrated. Since the second configuration illustrated in FIG. 3 is generally similar to the first configuration illustrated in FIG. 2, similar numerals are utilized to designate similar components, the suffix letter "a" being associated with the second configuration of FIG. 3 to avoid confusion. The second configuration of FIG. 3 is the same as the first configuration of FIG. 2 except that the second configuration of FIG. 3 does not include the ERBM 90 shown in the first configuration of FIG. 2.

Since the SCPM 60a in the second configuration of FIG. 3 does not have an ERBM, the SCPM can process only a single check. When a single check is received for processing, the check must be deposited into a bin (i.e., either the storage bin 84a or the reject bin 86a) before another check can be received for processing. This type of processing is sometimes referred to as "single-check processing". Accordingly, components of the SCPM 60a in the second configuration of FIG. 3 are in a second mode of operation to provide functionality of the Model CPM4 check processing module (which includes a single-check acceptor) sold by NCR Corporation.

Figure 4:
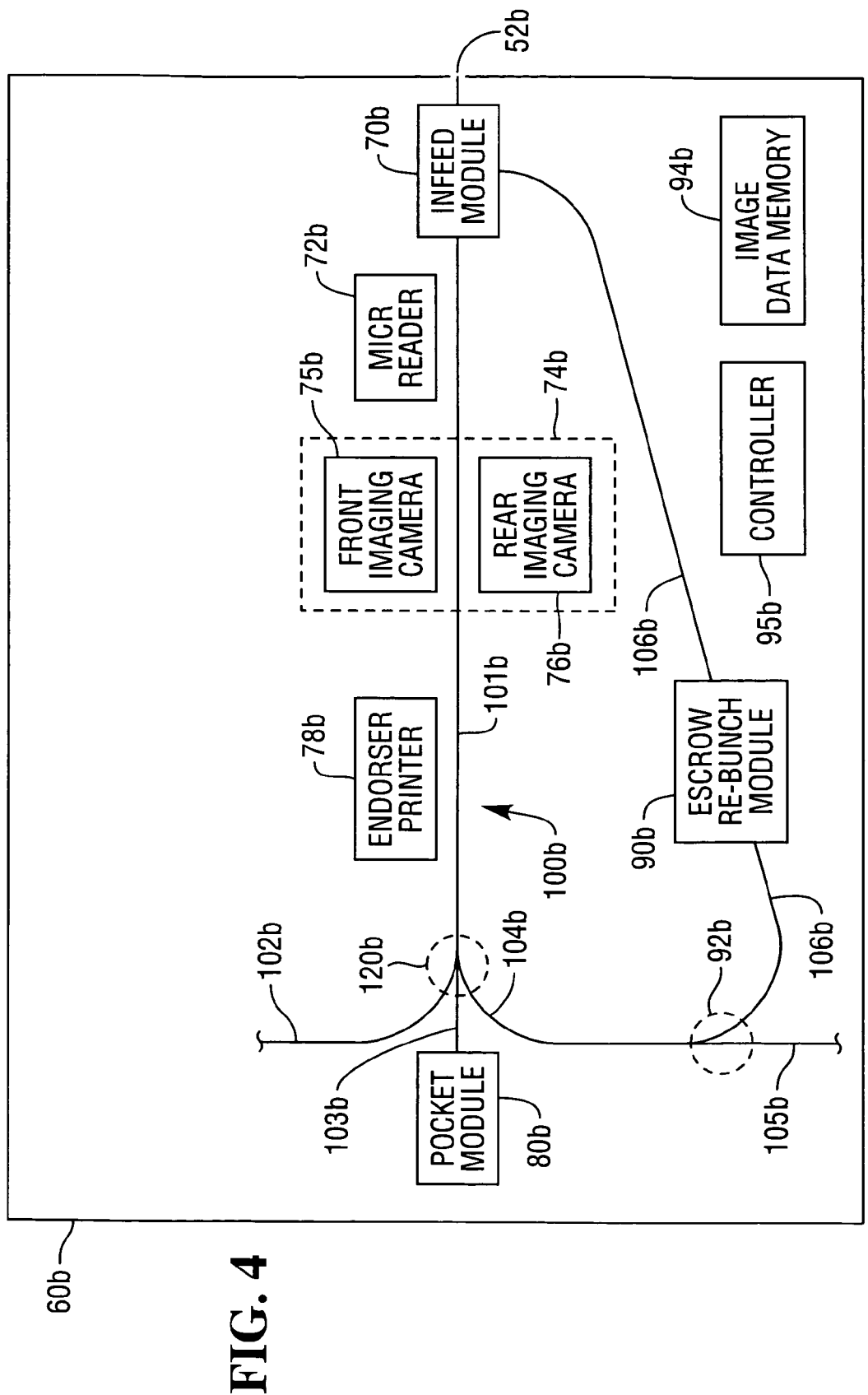
FIG. 4 is diagram similar to the diagram of FIG. 2, and illustrating a SCPM having a bunch-check acceptor and configured in a third configuration for operation in a second type of check depositing ATM (not shown) which is different from the first type of check depositing ATM of FIG. 1.

Referring to FIG. 4, a third configuration of the SCPM is illustrated. Since the third configuration illustrated in FIG. 4 is generally similar to the first configuration illustrated in FIG. 2, similar numerals are utilized to designate similar components, the suffix letter "b" being associated with the third configuration of FIG. 4 to avoid confusion.

The SCPM 60b shown in FIG. 4 comprises four main units which include the infeed module 70b, the pocket module 80b, the ERBM 90b, and the transport module 100b. The infeed module 70b receives a check which has been deposited into the check input/output slot 52b, and transports the check to an inlet of the transport module 100b. The dimensions of the infeed module 70b, such as its run length, may vary depending upon the particular model ATM the CPM 60b is installed. The structure and operation of the infeed module 70b are conventional and well known and, therefore, will not be described.

The transport module 100b includes a check input/output transport mechanism which receives a check from the inlet adjacent to the infeed module 70b, and transports the check along the first document track portion 101b which is the main track portion. The transport module 100b includes the first document diverter 120b which is operable to divert a check along the second document track portion 102b (not used in the third configuration shown in FIG. 4), the third document track portion 103b to the pocket module 80b, or the fourth document track portion 104b which leads to the ERBM 90b.

The second document diverter 92b is operable to divert a check along the fifth document track portion 105b (not used in the third configuration shown in FIG. 4), or the sixth document track portion 106b which leads to the ERBM 90b and then back to the infeed module 70b. More specifically, the sixth document track 106b interconnecting the ERBM 90b and the infeed module 70b allows a bunch of checks which has accumulated in the ERBM 90b to be transported from the ERBM back to the infeed module 70b. The structure and operation of the second diverter 92b are conventional and well known and, therefore, will not be described.

The transport module 100b further includes the magnetic ink character recognition (MICR) head 72b for reading magnetic details on a code line of a check. The transport module 100b also includes the imager 74b including the front imaging camera 75b and the rear imaging camera 76b for capturing an image of each side of a check (front and rear). The endorser printer 78b is provided for printing endorsements onto checks. The image data memory 94b is provided for storing images of checks. The controller 95b is provided for controlling the operation of the elements within the SCPM 60b.

It should be apparent from the third configuration of the SCPM 60b shown in FIG. 4 that a pocket module (designated with reference numeral "80b" in FIG. 4) is located in a central rear portion of the SCPM. The ERBM 90b shown in the third configuration of FIG. 4 is the same as the ERBM 90 shown in the first configuration of FIG. 2 described hereinabove. Accordingly, components of the SCPM 60b in the third configuration of FIG. 4 are in a third mode of operation to provide functionality of the Model CPM2 check processing module (which includes a bunch-check acceptor) sold by NCR Corporation.

Figure 5:
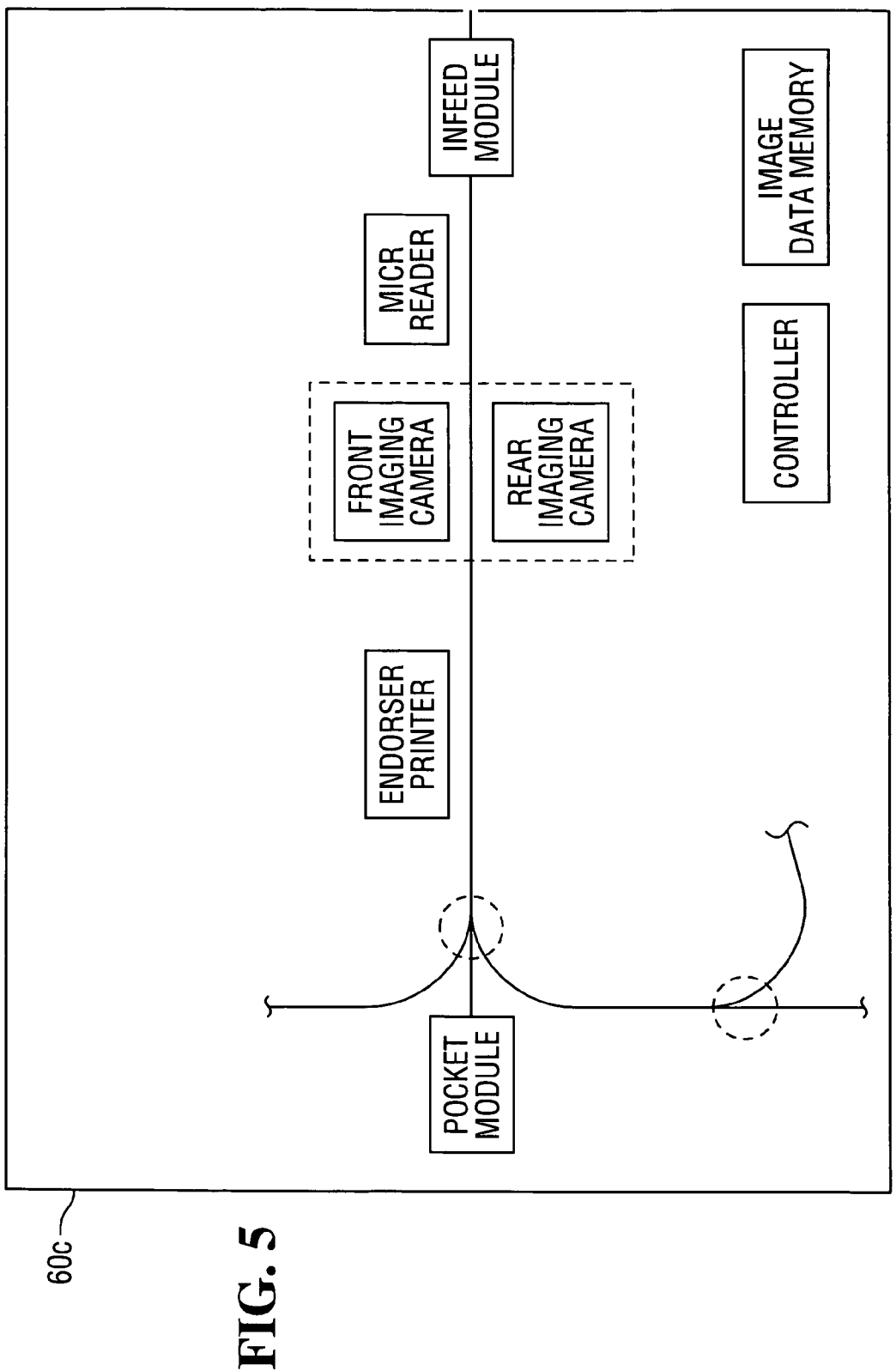
FIG. 5 is diagram similar to the diagram of FIG. 4, and illustrating a SCPM having a single-check acceptor and configured in a fourth configuration for operation in the second type of check depositing ATM.

Referring to FIG. 5, a fourth configuration of the SCPM is illustrated. Since the fourth configuration illustrated in FIG. 5 is generally similar to the third configuration illustrated in FIG. 4, similar numerals are utilized to designate similar components, the suffix letter "c" being associated with the fourth configuration of FIG. 5 to avoid confusion. The fourth configuration of FIG. 5 is the same as the third configuration of FIG. 4 except that the fourth configuration of FIG. 5 does not include the ERBM 90b shown in the third configuration of FIG. 4.

Since the SCPM 60c in the fourth configuration of FIG. 5 does not have an ERBM, the SCPM can process only a single check. This single-check processing in the fourth configuration of FIG. 5 is the same as the single-check processing in the second configuration of FIG. 3 described hereinabove. Accordingly, components of the SCPM 60c in the fourth configuration of FIG. 5 are in a fourth mode of operation to provide functionality of the Model CPM2 check processing module (which includes a single-check acceptor) sold by NCR Corporation.

Figure 6:
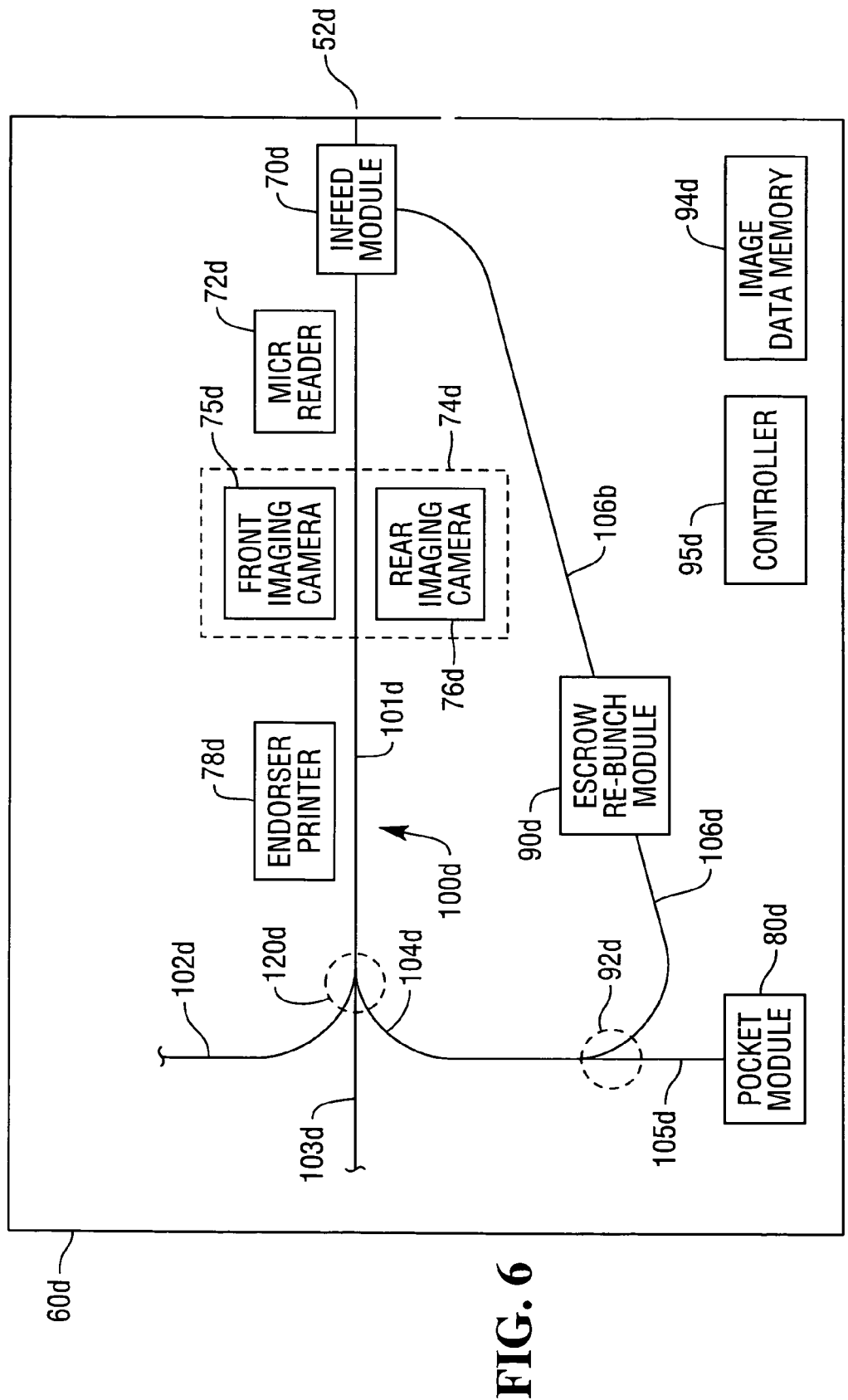
FIG. 6 is diagram similar to the diagram of FIG. 4, and illustrating a SCPM having a bunch-check acceptor and configured in a fifth configuration for operation in a third type of check depositing ATM (not shown) which is different from the second type of check depositing ATM (also, not shown) and the first type of check depositing ATM of FIG. 1.

Referring to FIG. 6, a fifth configuration of the SCPM is illustrated. Since the fifth configuration illustrated in FIG. 6 is generally similar to the first configuration illustrated in FIG. 2, similar numerals are utilized to designate similar components, the suffix letter "d" being associated with the fifth configuration of FIG. 6 to avoid confusion.

The SCPM 60d shown in FIG. 6 comprises four main units which include the infeed module 70d, the pocket module 80d, the ERBM 90d, and the transport module 100d. The infeed module 70d receives a check which has been deposited into the check input/output slot 52d, and transports the check to an inlet of the transport module 100d. The dimensions of the infeed module 70d, such as its run length, may vary depending upon the particular model ATM the SCPM 60d is installed. The structure and operation of the infeed module 70d are conventional and well known and, therefore, will not be described.

The transport module 100d includes a check input/output transport mechanism which receives a check from the inlet adjacent to the infeed module 70d, and transports the check along the first document track portion 101d which is the main track portion. The transport module 100d includes the first document diverter 120d which is operable to divert a check along the second document track portion 102d (not used in the fifth configuration shown in FIG. 6), the third document track portion 103d (also not used in the fifth configuration shown in FIG. 6), or the fourth document track portion 104d which leads to either the pocket module 80d or the ERBM 90d.

More specifically, the second document diverter 92d is operable to divert a check along either the fifth document track portion 105d which leads to the pocket module 80d or the sixth document track portion 106d which leads to the ERBM 90d and then back to the infeed module 70d. The sixth document track 106d interconnecting the ERBM 90d and the infeed module 70d allows a bunch of checks which has accumulated in the ERBM 90d to be transported from the ERBM back to the infeed module 70d. The structure and operation of the second diverter 92d are conventional and well known and, therefore, will not be described.

The transport module 100d further includes the magnetic ink character recognition (MICR) head 72d for reading magnetic details on a code line of a check. The transport module 100d also includes the imager 74d including the front imaging camera 75d and the rear imaging camera 76d for capturing an image of each side of a check (front and rear). The endorser printer 78d is provided for printing endorsements onto checks. The image data memory 94d is provided for storing images of checks. The controller 95d is provided for controlling the operation of the elements within the SCPM 60d.

It should be apparent from the fifth configuration of the SCPM 60d shown in FIG. 6 that a pocket module (designated with reference numeral "80d" in FIG. 6) is located in a lower or bottom portion of the SCPM. The ERBM 90d in the fifth configuration of FIG. 6 is the same as the ERBM 90 shown in the first configuration of FIG. 2 described hereinabove. Accordingly, components of the SCPM 60d in the fifth configuration of FIG. 6 are in a fifth mode of operation to provide functionality of the Model CPM3 check processing module (which includes a bunch-check acceptor) sold by NCR Corporation.

Figure 7:
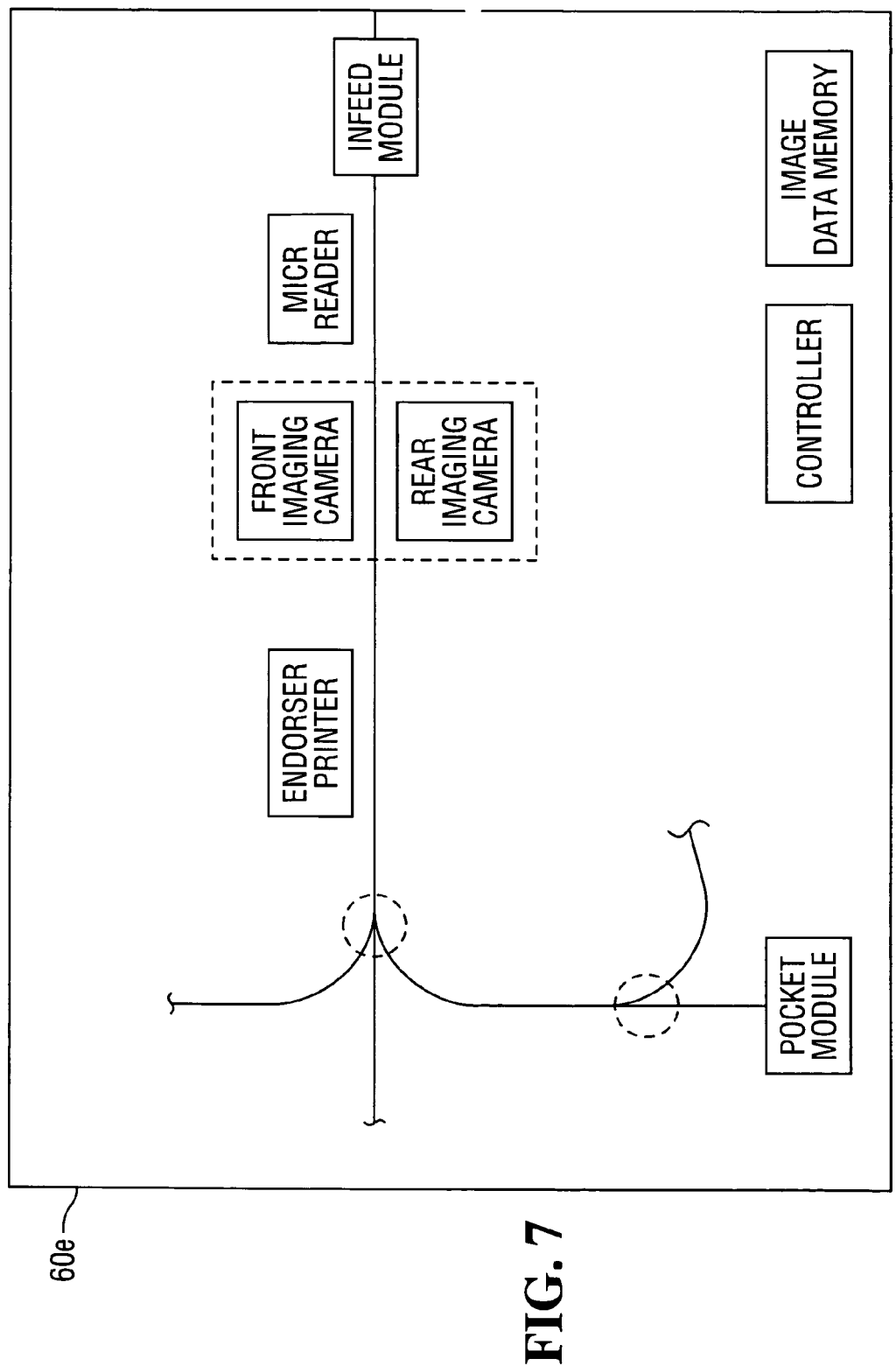
FIG. 7 is diagram similar to the diagram of FIG. 6, and illustrating a SCPM having a single-check acceptor and configured in a sixth configuration for operation in the third type of check depositing ATM.

Referring to FIG. 7, a sixth configuration of the SCPM is illustrated. Since the sixth configuration illustrated in FIG. 7 is generally similar to the fifth configuration illustrated in FIG. 6, similar numerals are utilized to designate similar components, the suffix letter "e" being associated with the sixth configuration of FIG. 7 to avoid confusion. The sixth configuration of FIG. 7 is the same as the fifth configuration of FIG. 6 except that the sixth configuration of FIG. 7 does not include the ERBM 90d shown in the fifth configuration of FIG. 6.

Since the SCPM 60e in the sixth configuration of FIG. 7 does not have an ERBM, the SCPM can process only a single check. This single-check processing in the sixth configuration of FIG. 7 is the same as the single-check processing in the second configuration of FIG. 3 and the fourth configuration of FIG. 5, both described hereinabove. Accordingly, components of the SCPM 60e in the sixth configuration of FIG. 7 are in a sixth mode of operation to provide functionality of the Model CPM3 check processing module (which includes a single-check acceptor) sold by NCR Corporation.

The structure and operation of the SCPM in the six different modes of operation just described hereinabove are described in more detail hereinbelow. For simplicity, the detailed description below will be mainly from the vantage point of the first configuration of the SCPM 60 of FIG. 2.

Figure 9:
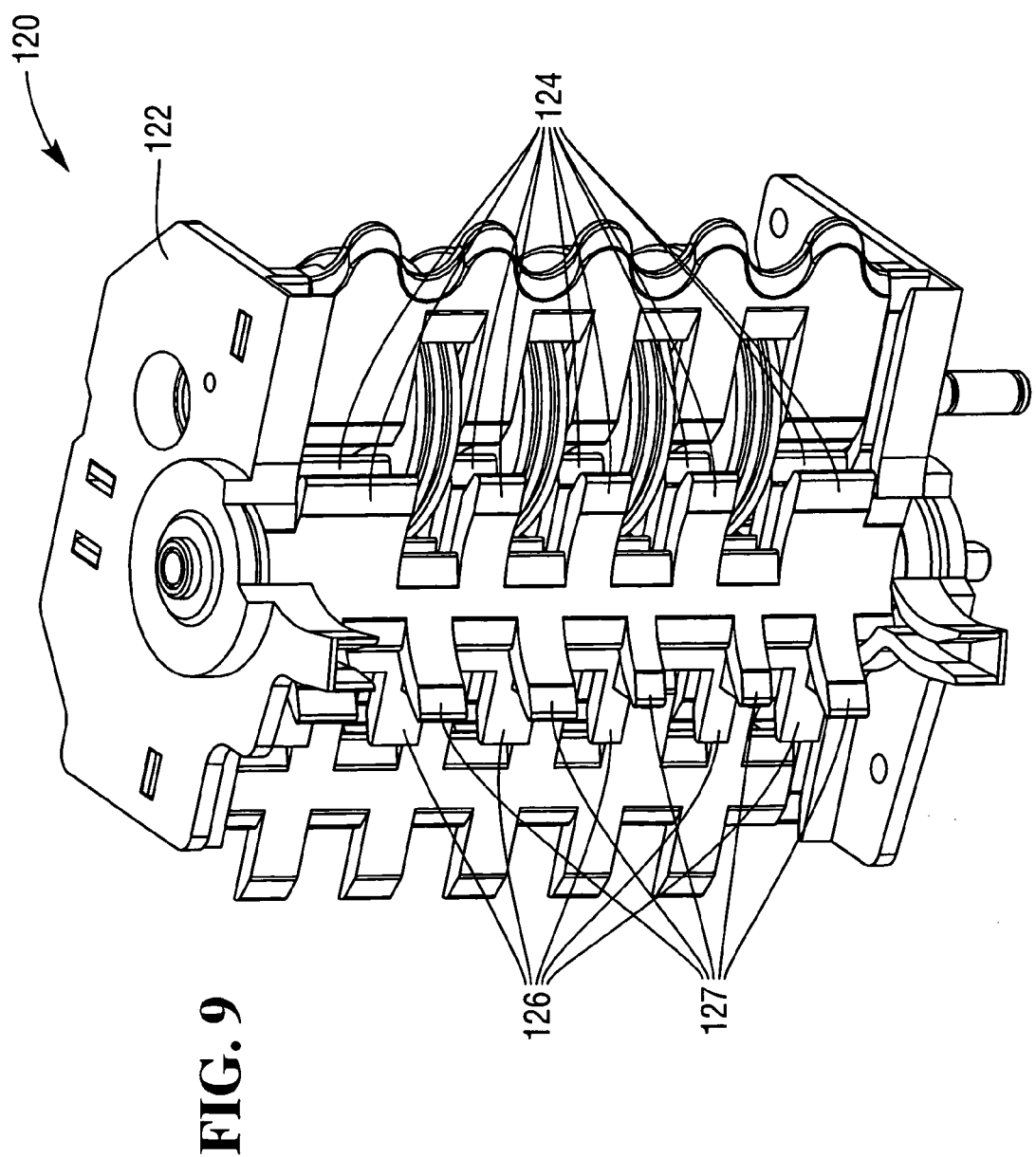
FIG. 9 is a pictorial view of a diverter used in the transport module of FIG. 8.
Figure 10:
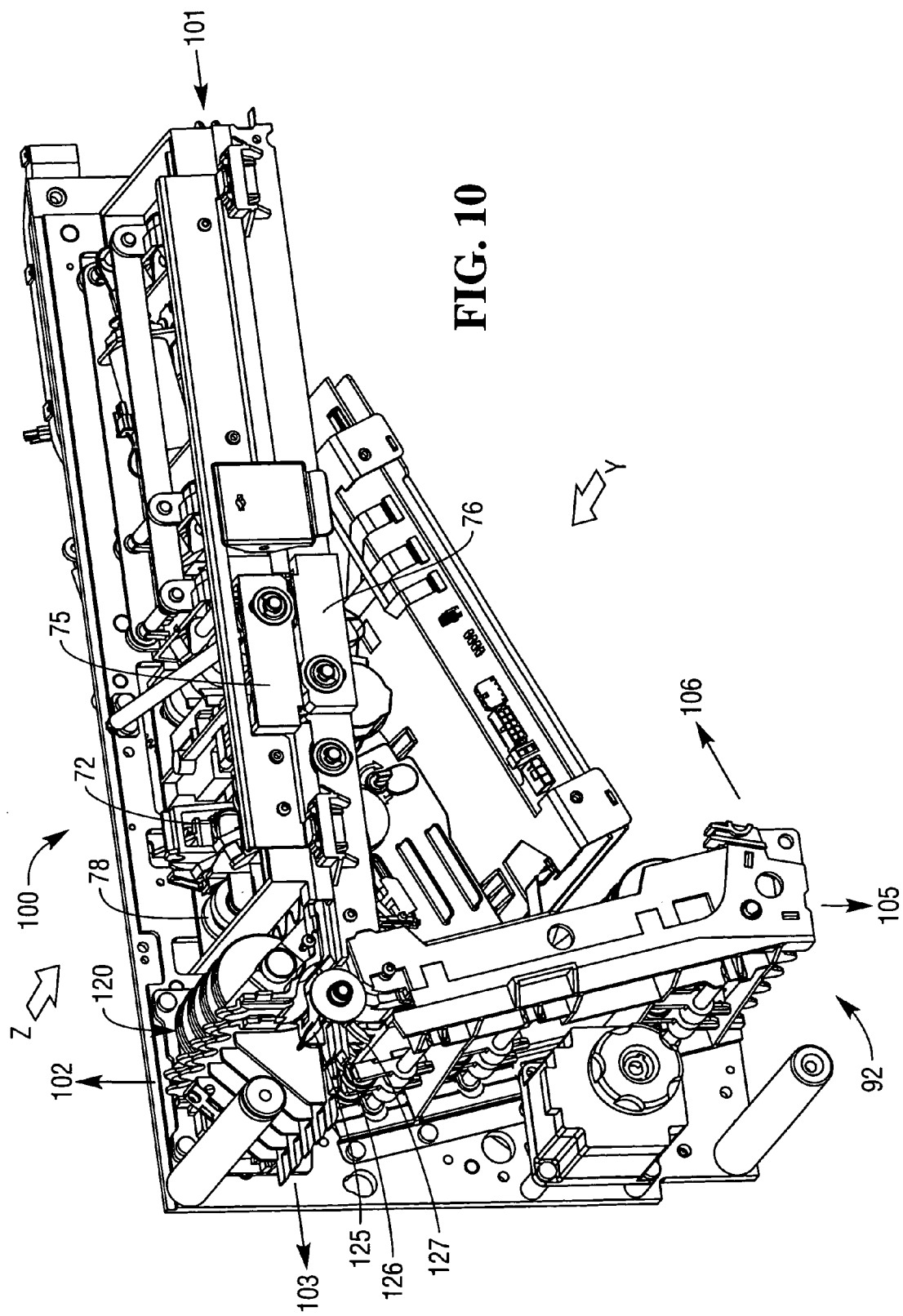
FIG. 10 is a view similar to the view of FIG. 8, and showing an end plate portion removed to better illustrate the diverter of FIG. 9.

FIG. 9 is a pictorial view of the first diverter 120 in the form of a diverter blade. FIG. 10 is a view similar to the view of FIG. 8, and shows an end plate portion 122 (shown in FIGS. 8 and 9) removed for better viewing of the construction of parts of the first diverter 120. The first diverter 120 has a first plurality of fingers 124, a second plurality of fingers 125 (shown in FIG. 10), a third plurality of fingers 126, and a fourth plurality of fingers 127, for diverting documents such as checks in a manner to be described later.

Figure 11:
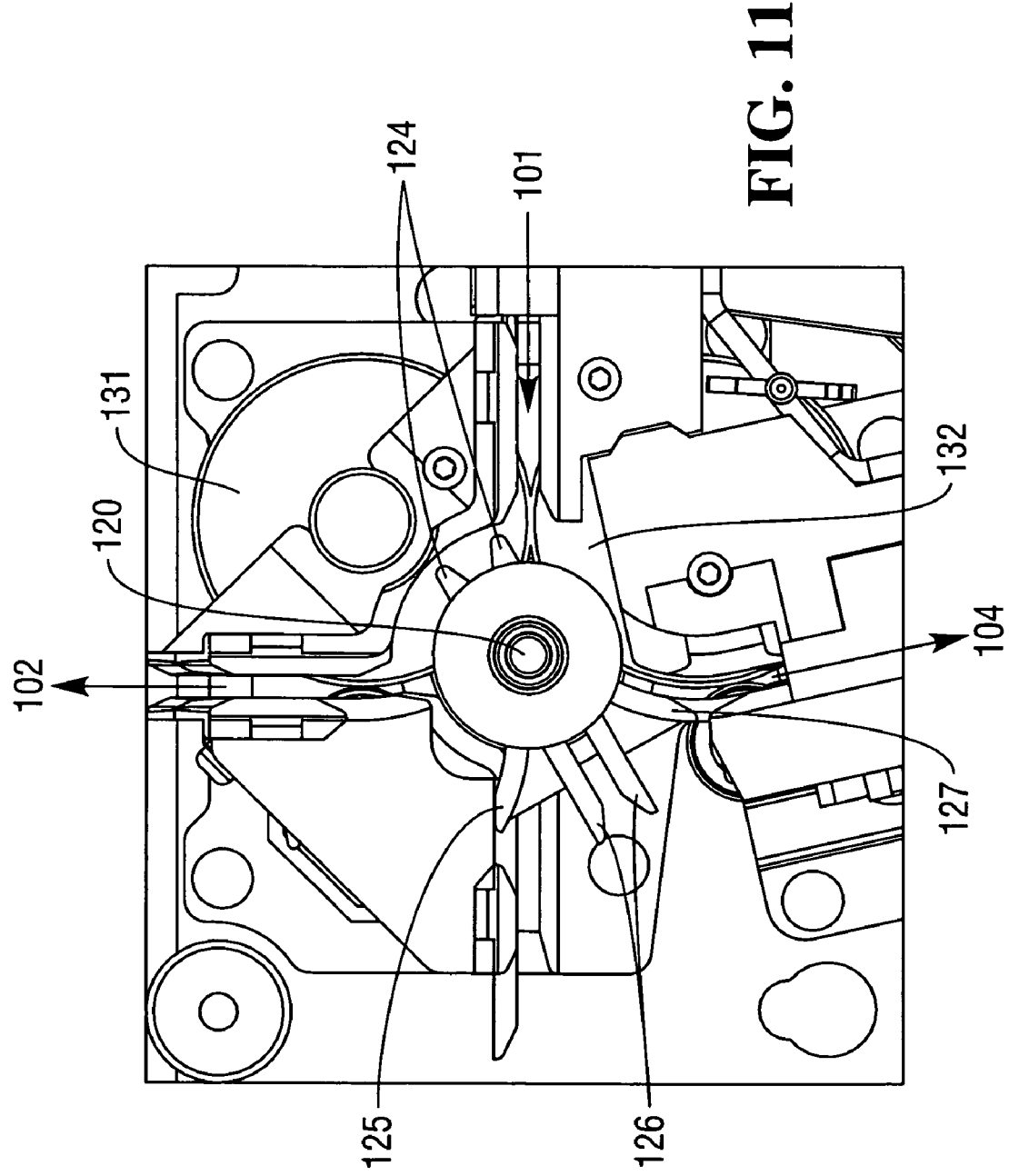
FIG. 11 is an elevational view, looking approximately in the direction of arrow Y shown in FIG. 10, and illustrating position of the diverter in a home position when the SCPM is configured in the first configuration of FIG. 2.
Figure 12:
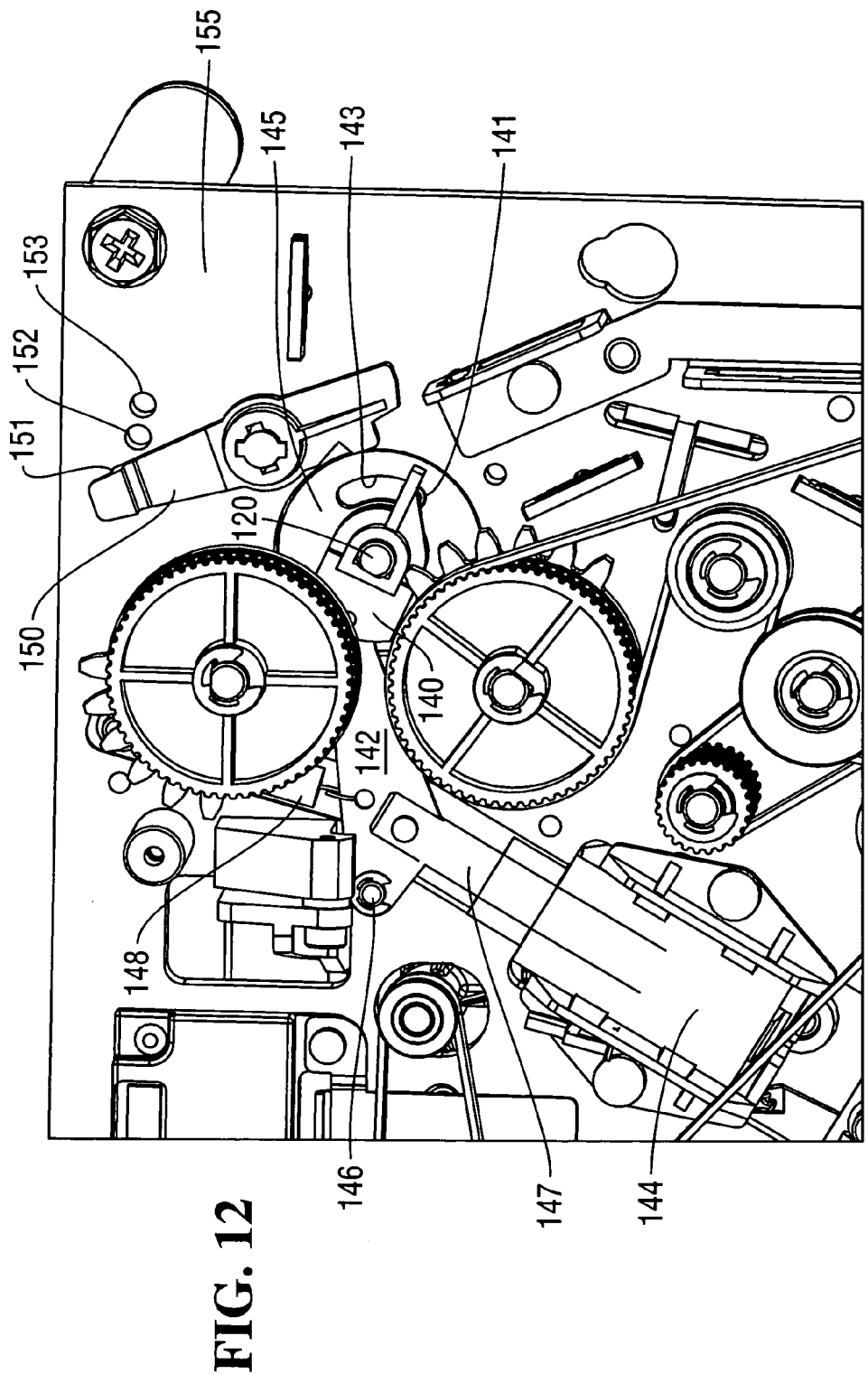
FIG. 12 is an elevational view, looking approximately in the direction of arrow Z shown in FIG. 10, and illustrating position of parts of an actuator mechanism for the diverter in the home position of FIG. 11 when the SCPM is configured in the first configuration of FIG. 2.

FIG. 11 is an elevational view, looking approximately in the direction of arrow Y shown in FIG. 10. FIG. 11 shows position of the first diverter 120 when parts are in a home position. FIG. 12 is an elevational view, looking approximately in the direction of arrow Z shown in FIG. 10. FIG. 12 shows position of parts of an actuator mechanism for the first diverter 120 when parts are in the home position of FIG. 11.

As shown in FIG. 11, a first drive roller 131 and a second drive roller 132 co-operate to transport a check along the first track portion 101 towards the first diverter 120. The first diverter 120 has the first, second, third, and fourth sets of fingers 124, 125, 126, 127. As shown in FIG. 12, the actuator mechanism for the first diverter 120 includes a diverter arm 140 which is coupled to a pivot plate 142. A pin 141 is connected to the diverter 120 and extends into a slot 143 of a base member 145. The extent of movement of the pin 141 is limited by the size of the slot 143.

Figure 13:
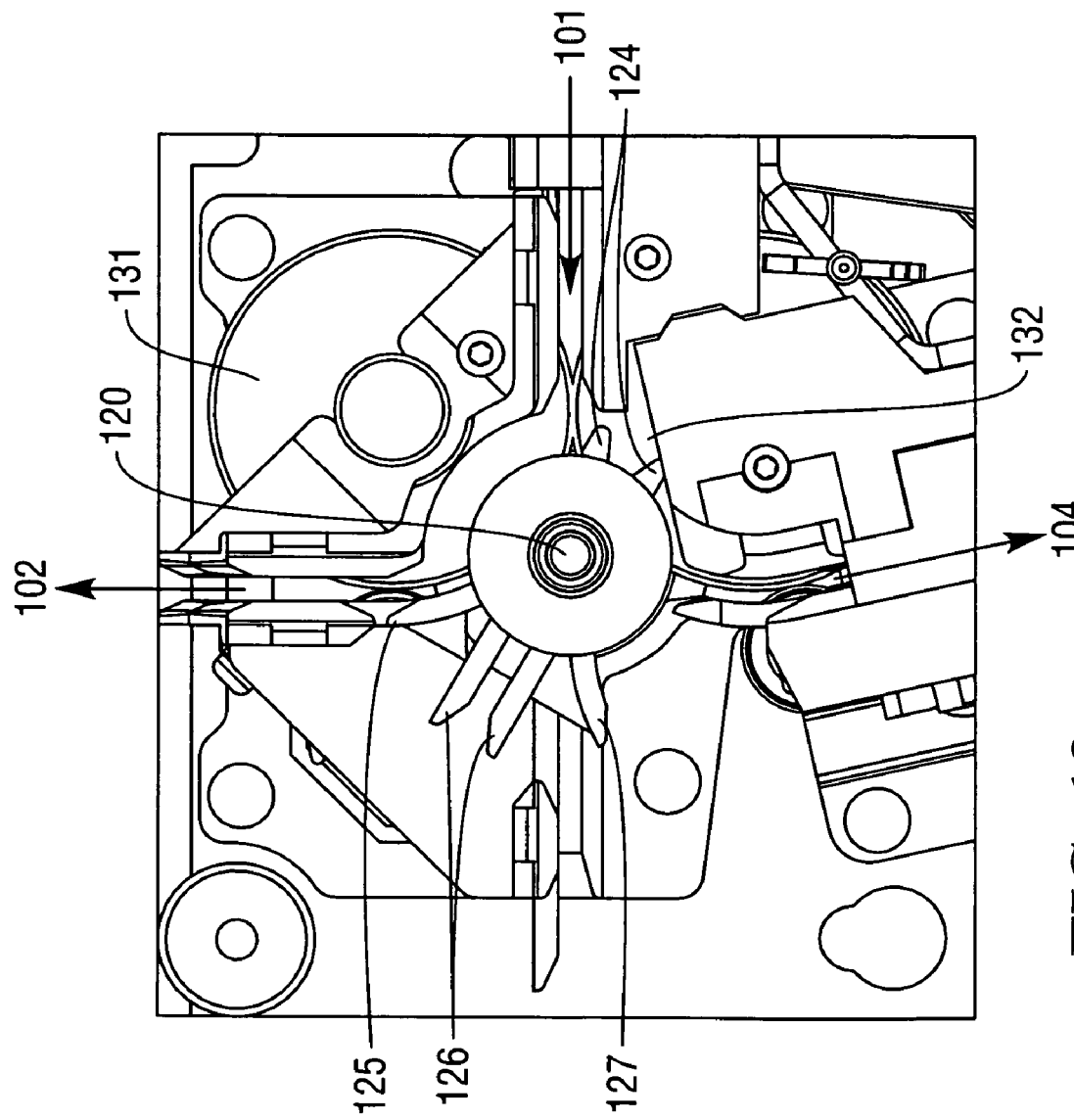
FIG. 13 view similar to FIG. 11, and illustrating position of the diverter when a solenoid in the actuator mechanism of FIG. 12 is actuated.

The pivot plate 142 is pivotable about a fixed shaft 146. An extension spring 148 is connected to the pivot plate 142 and provides a biasing force which acts through the pivot plate 142 and the diverter arm 140 to maintain parts in the home position shown in FIGS. 8 and 9. An actuatable solenoid 144 has a plunger 147 which is connected to the pivot plate 142. When the solenoid 144 is actuated, parts move from the home position shown in FIGS. 11 and 12 to the position shown in FIGS. 13 and 14, respectively. When the solenoid 144 is deactuated, parts return from the position shown in FIGS. 13 and 14 back to the home position shown in FIGS. 11 and 12. Accordingly, in the first mode of operation of the SCPM 60 shown in FIG. 2, the first diverter 120 is movable between the home position (i.e., the solenoid is not actuated) shown in FIGS. 11 and 12 and the solenoid-actuated position shown in FIGS. 13 and 14.

When the SCPM 60 is in the first mode of operation as shown in FIG. 2, a detent arm 150 (FIGS. 12 and 14) is disposed in a first hole 151 in a base plate 155. The detent arm 150 can be disposed in a second hole 152 to configure the SCPM to operate in a second mode of operation which will be described later. Also, the detent arm 150 can be disposed in a third hold 153 to configure the SCPM to operate in a third mode of operation which will also be described later.

Figure 14:
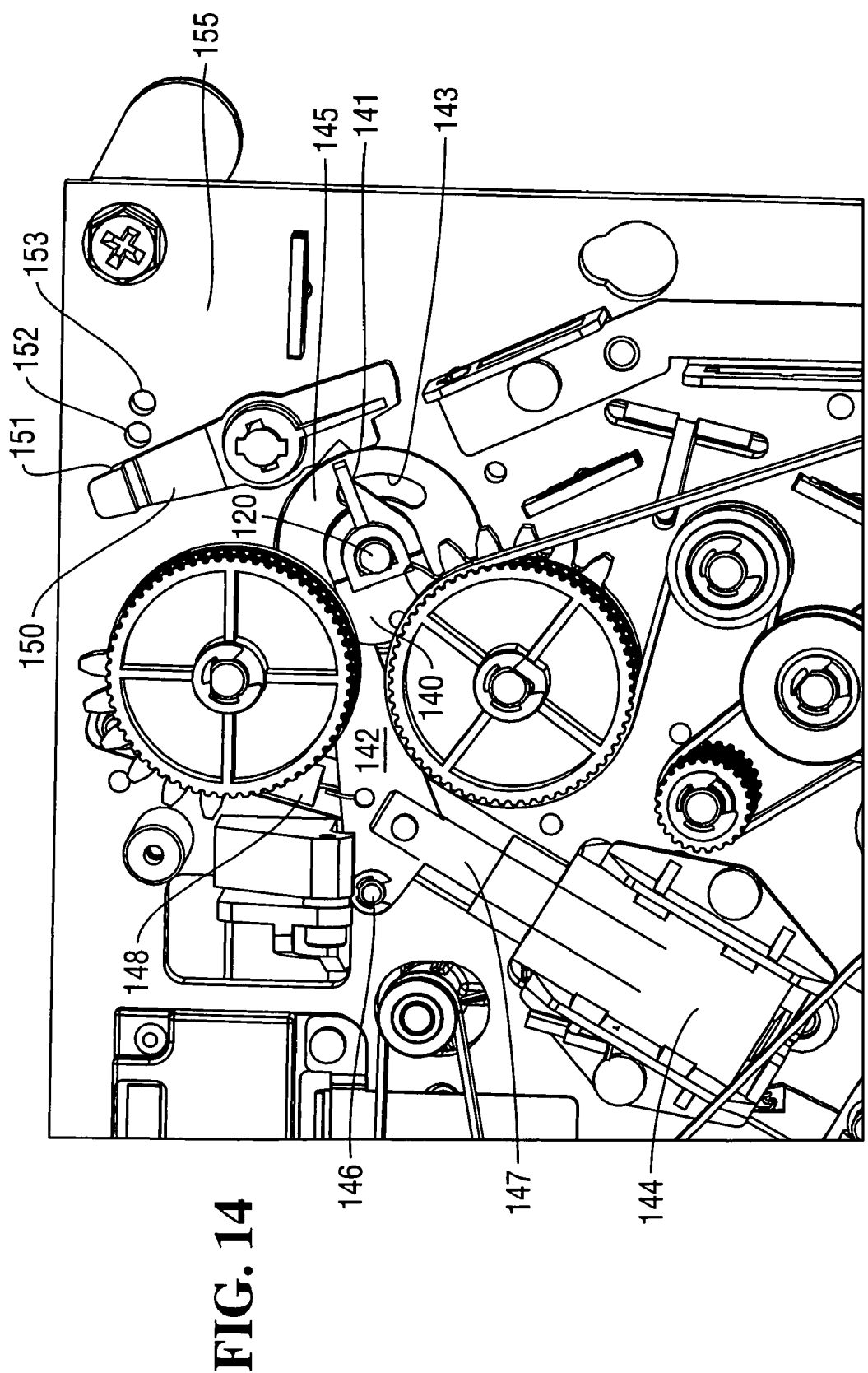
FIG. 14 is view similar to FIG. 12, and illustrating position of parts of the actuator mechanism when a solenoid in the actuator mechanism is actuated.

When the detent arm 150 is disposed in the first hole 151 as shown in FIGS. 12 and 14, the detent arm 150 is in a position which allows the pin 141 to move within the full extent of the slot 143 between the home position shown in FIG. 12 to the solenoid-actuated position shown in FIG. 14. Accordingly, when the SCPM 60 is configured to operate in the first mode of operation and the detent arm 150 is disposed in the first hole 151, a check can be transported from the first track portion 101 (see FIGS. 11 and 13) to either the fourth track portion 104 to the ERBM 90 when parts are in the home position shown in FIGS. 11 and 12 or the second track portion 102 to the pocket module 80 when parts are in the solenoid-actuated position shown in FIGS. 13 and 14. It should be noted that operation of parts just described hereinabove in FIGS. 11, 12, 13, and 14 for the first mode of operation of FIG. 2 is the same for the second mode of operation of FIG. 3.

Figure 15:
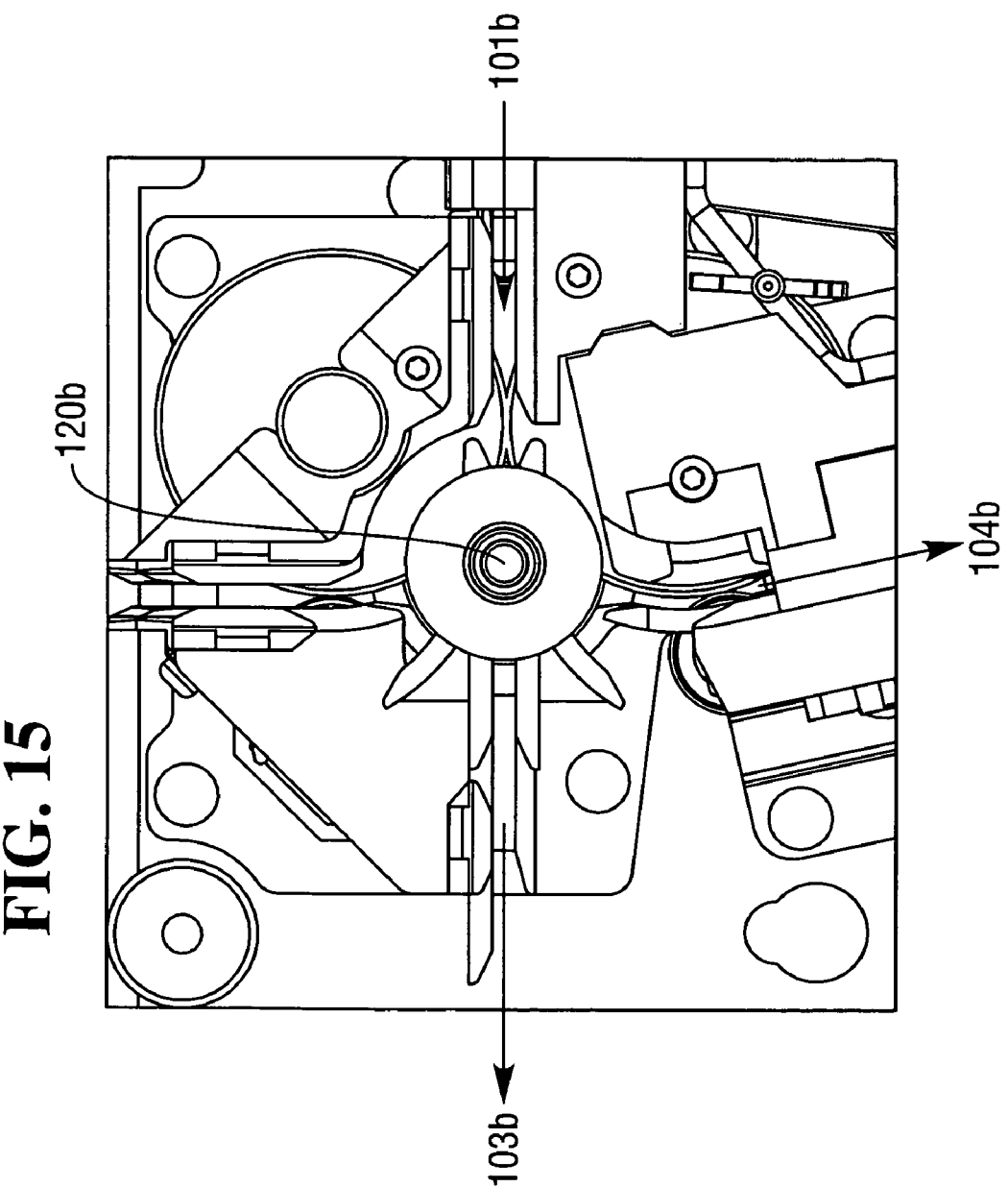
FIG. 15 is a view similar to the view of FIG. 13, and illustrating position of the diverter when the SCPM is configured in the third configuration of FIG. 4 and the solenoid is actuated.
Figure 16:
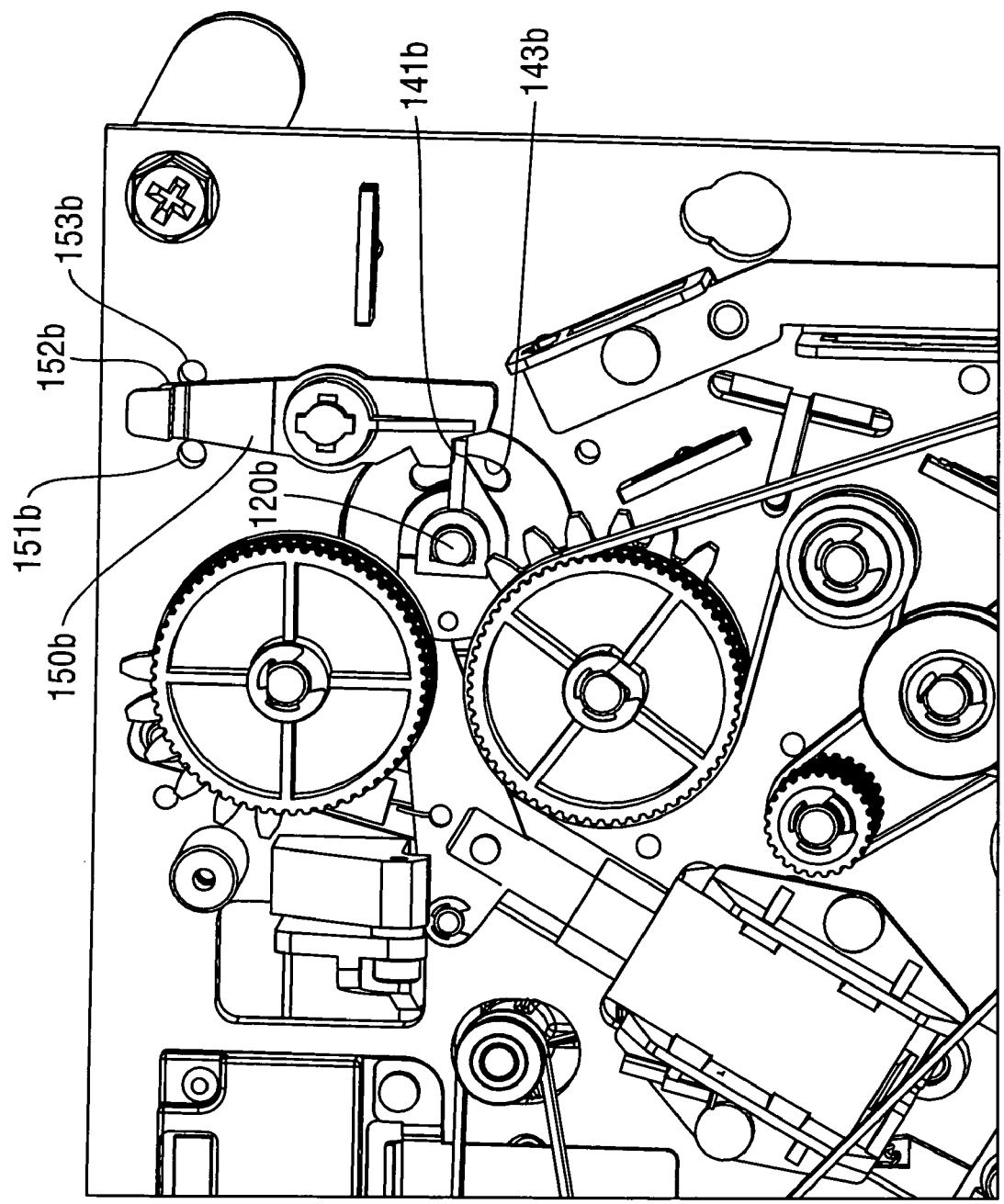
FIG. 16 is a view similar to the view of FIG. 14, and illustrating position of parts of the actuator mechanism when the SCPM is configured in the third configuration of FIG. 4 and the solenoid is actuated.

FIG. 15 is another elevational view, looking approximately in the direction of arrow Y shown in FIG. 10. FIG. 15 shows position of the first diverter 120b when the SCPM is configured to operate in the third mode of operation as shown in FIG. 4. FIG. 16 is another elevational view, looking approximately in the direction of arrow Z shown in FIG. 10. FIG. 16 shows position of parts of the actuator mechanism for the first diverter 120b when the SCPM 60b is configured to operate in the third mode of operation as shown in FIG. 4.

As shown in FIG. 16, the detent arm 150b is disposed in the second hole 152b. In FIG. 16, the detent arm 150b is in a position which allows the pin 141b to move within about half the extent of the slot 143b between the home position (not shown) and the solenoid-actuated position which is shown in FIGS. 15 and 16. The home position for when the SCPM 60b is configured to operate in the third mode of operation is similar to that shown in FIG. 12 just described hereinabove except that the detent arm 150b in FIG. 16 is in the second hole 152b instead of the first hole 151b or the third hole 153b. Accordingly, when the SCPM 60b is configured to operate in the third mode of operation as shown in FIG. 4 and the detent arm 150b is disposed in the second hole 152b as shown in FIG. 16, a check can be transported from the first track portion 101b (FIG. 15) to either the fourth track portion 104b to the second diverter 92b to the ERBM 90b when parts are in the home position (not shown) or the third track portion 103b to the pocket module 80b when parts are in the solenoid-actuated position shown in FIGS. 15 and 16. It should be noted that operation of parts just described hereinabove in FIGS. 15 and 16 for the third mode of operation of FIG. 4 is the same for the fourth mode of operation of FIG. 5.

Figure 17:
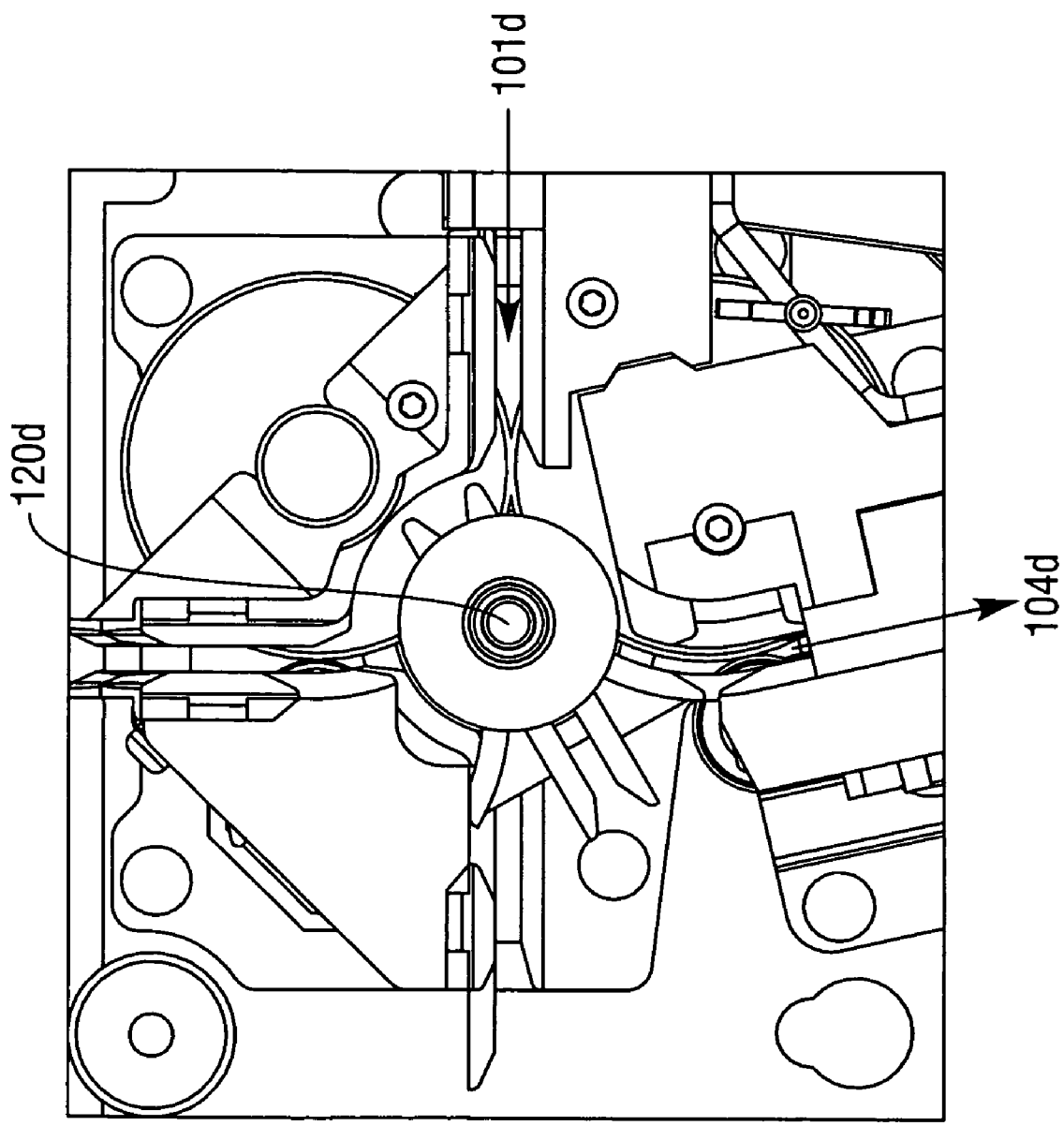
FIG. 17 is a view similar to the view of FIG. 13, and illustrating position of the diverter when the SCPM is configured in the fifth configuration of FIG. 6 and the solenoid is actuated.
Figure 18:
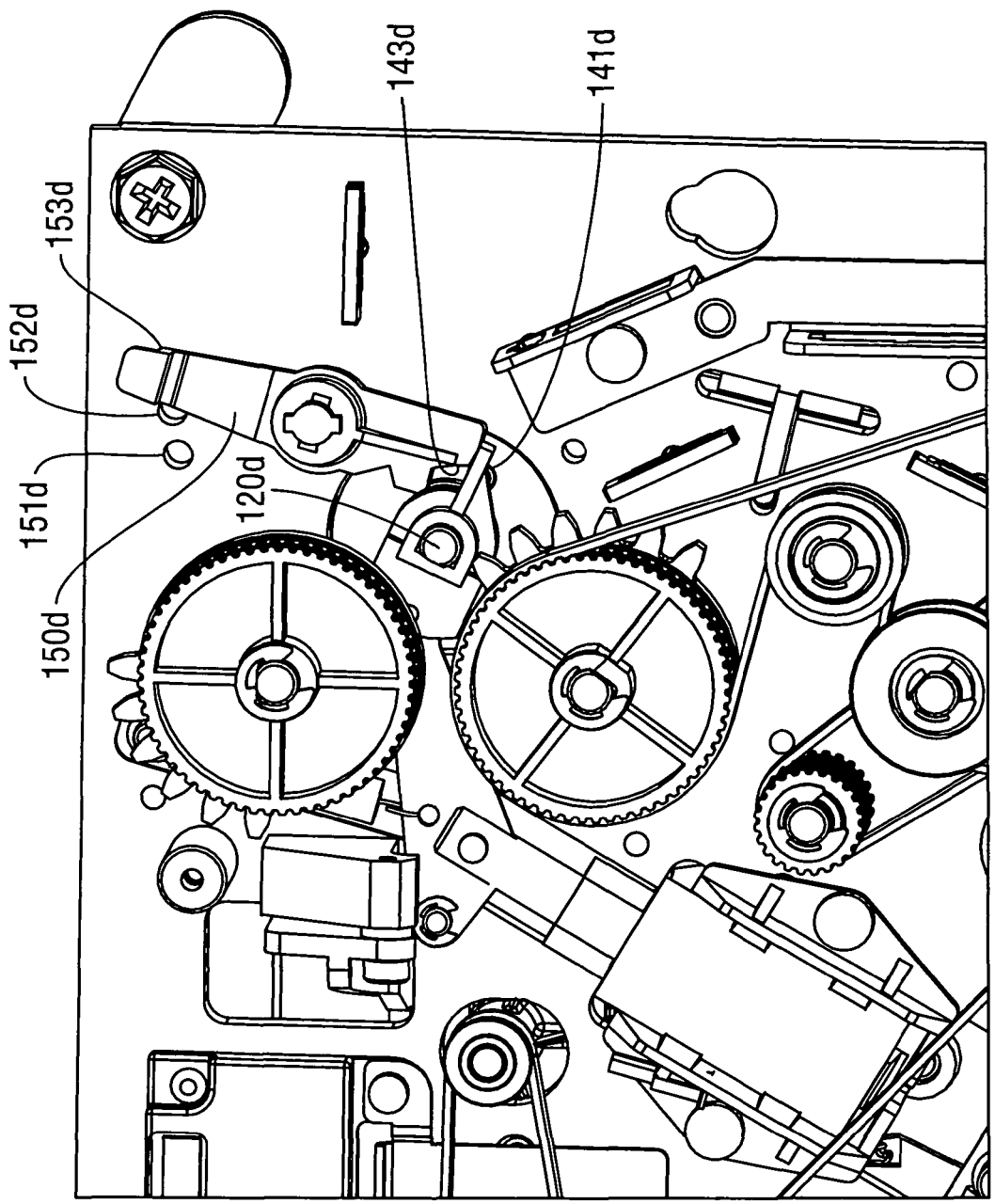
FIG. 18 is a view similar to the view of FIG. 14, and illustrating position of parts of the actuator mechanism when the SCPM is configured in the fifth configuration of FIG. 6 and the solenoid is actuated.

FIG. 17 is yet another elevational view, looking approximately in the direction of arrow Y shown in FIG. 10. FIG. 17 shows position of the first diverter 120d when the SCPM is configured to operate in the fifth configuration as shown in FIG. 6. FIG. 18 is yet another elevational view, looking approximately in the direction of arrow Z shown in FIG. 10. FIG. 18 shows position of parts of an actuator mechanism for the first diverter 120d when the SCPM is configured to operate in the fifth mode of operation as shown in FIG. 6.

As shown in FIG. 18, the detent arm 150d is disposed in the third hole 153d. In FIG. 18, the detent arm 150d is in a position which constrains the pin 141d in the slot 143d to remain substantially in the home position (not shown) and the solenoid-actuated position which is shown in FIGS. 17 and 18. The home position for when the SCPM 60d is configured to operate in the fifth mode of operation is similar to that shown in FIG. 12 just described hereinabove except that the detent arm 150d in FIG. 18 is in the third hole 153d instead of the first hole 151d or the second hole 152d. Accordingly, when the SCPM 60d is configured to operate in the fifth mode of operation as shown in FIG. 6 and the detent arm 150d is disposed in the third hole 153d as shown in FIG. 18, a check can be transported from the first track portion 101d along only the fourth track portion 104d to the second diverter 92d to the ERBM 90d whether parts are in the home position (not shown) or are in the solenoid-actuated position shown in FIGS. 17 and 18. It should be noted that operation of parts just described hereinabove in FIGS. 17 and 18 for the fifth mode of operation of FIG. 6 is the same for the sixth mode of operation of FIG. 7.

It should be apparent that the co-operation of the first diverter 120 and the second diverter 92 in the first configuration of FIG. 2 provides a user with the flexibility to configure a check processing module for any one of the six different modes of operation described hereinabove. More specifically, in the first configuration of FIG. 2, a pocket module is located at a top location and an ERBM is provided. In the second configuration of FIG. 3, a pocket module is located at a top location and an ERBM is not provided. In the third configuration of FIG. 4, a pocket module is located at a rear location and an ERBM is provided. In the fourth configuration of FIG. 5, a pocket module is located at a rear location and an ERBM is not provided. In the fifth configuration of FIG. 6, a pocket module is located at a bottom location and an ERBM is provided. In the sixth configuration of FIG. 7, a pocket module is located at a bottom location and an ERBM is not provided.

Although the above description describes checks being transported in a forward direction through the first diverter 120 in the first configuration of FIG. 2, it is conceivable that checks be transported in a reverse direction through the first diverter. The construction of the first, second, third, and fourth sets of fingers 124, 125, 126, 127 (best shown in FIGS. 9 and 10) is such that checks can be transported in directions which are opposite to those described hereinabove without having to be concerned about checks getting caught by the fingers and causing a document jam condition. Accordingly, the structure of the first diverter 120 enables bidirectional flow of checks therethrough.

Also, although the above description describes the PERSONAS (trademark) 6676 NCR ATM embodying the present invention, it is conceivable that other models of ATMs, other types of ATMs, or other types of self-service check depositing terminals may embody the present invention. Self-service depositing terminals are generally public-access devices that are designed to allow a user to conduct a check deposit transaction in an unassisted manner and/or in an unattended environment. Self-service check depositing terminals typically include some form of tamper resistance so that they are inherently resilient.

The particular arrangements disclosed are meant to be illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A scaleable check processing module (SCPM) for a self-service check depositing terminal, the SCPM comprising:
   a supporting structure; and
   a first configurable mechanism located in the supporting structure and for (i) enabling a pocket module to be disposed at a first location of the supporting structure when the SCPM is to be installed into a first type of self-service check depositing terminal, (ii) enabling a pocket module to be disposed at a second location which is different from the first location of the supporting structure when the SCPM is to be installed into a second type of self-service check depositing terminal which is different from the first type of self-service depositing terminal, and (iii) enabling a pocket module to be disposed at a third location which is different from the first and second locations of the supporting structure when the SCPM is to be installed into a third type of self-service check depositing terminal which is different from the first and second types of self-service depositing terminals;
   wherein the first configurable mechanism includes a three-way diverter which (i) diverts checks from an inlet path to a first outlet path when the SCPM is installed into the first type of self-service check depositing terminal, (ii) diverts checks from the inlet path to a second outlet path which is different from the first outlet path when the SCPM is installed into the second type of self-service check depositing terminal, and (iii) diverts checks from the inlet path to a third outlet path which is different from the first and second outlet paths when the SCPM is installed into the third type of self-service check depositing terminal.

2. A SCPM according to claim 1, further comprising a second configurable mechanism located in the supporting structure and for enabling an escrow re-bunch module (ERBM) to be installed.

3. A SCPM according to claim 2, wherein the second configurable mechanism comprises a two-way diverter which (i) diverts checks from an input path to a first output path when an ERBM is not installed, and (ii) diverts checks from the input path to a second output path which is different from the first output path when an ERBM is installed.

4. A SCPM according to claim 3, wherein the input path of the two-way diverter and one of the first, second, and third outlet paths of the three-way diverter form a single continuous document transport path.

5. A SCPM according to claim 1, wherein (i) the first location is in vicinity of a top portion of the supporting structure, (ii) the second location is in vicinity of a central portion of the supporting structure, and (iii) the third location is in vicinity of a bottom portion of the supporting structure.

6. A scaleable check processing module (SCPM) for a self-service check depositing terminal, the SCPM comprising:

a first configurable feature in which location of a pocket module within the self-service check depositing terminal is user-selectable from a plurality of different locations based upon a type of the self-service check depositing terminal; and a second configurable feature in which type of check acceptor is user-selectable from a plurality of types;

wherein the first configurable feature includes a diverter which diverts checks from an inlet path to one of a plurality of different outlet paths corresponding to the type of self-service check depositing terminal to transport checks to the location of the pocket module.

7. A SCPM according to claim 6, wherein the location of the pocket module is selectable from three different locations.

8. A SCPM according to claim 7, wherein (i) a first of the three locations is at a top portion of the SCPM, (ii) a second of the three locations is at a rear portion of the SCPM, and (iii) a third of the three locations is at a bottom portion of the SCPM.

9. A SCPM according to claim 8, wherein (i) a first type of check acceptor comprises a bunch-check acceptor, and (ii) a second type of check acceptor comprises a single-check acceptor.

10. A SCPM according to claim 6, wherein (i) a first type of check acceptor comprises a bunch-check acceptor, and (ii) a second type of check acceptor comprises a single-check acceptor.

* * * * *